(12) United States Patent
Baldwin et al.

(10) Patent No.: US 9,047,382 B2
(45) Date of Patent: Jun. 2, 2015

(54) CUSTOMIZED PRESENTATION OF EVENT GUEST LISTS IN A SOCIAL NETWORKING SYSTEM

(75) Inventors: Robert Michael Baldwin, San Francisco, CA (US); Henry Bridge, San Francisco, CA (US); Robyn David Morris, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 90 days.

(21) Appl. No.: 13/584,714

(22) Filed: Aug. 13, 2012

(65) Prior Publication Data

US 2014/0047045 A1 Feb. 13, 2014

(51) Int. Cl.
*G06F 15/16* (2006.01)
*G06F 17/30* (2006.01)
*G06Q 50/00* (2012.01)

(52) U.S. Cl.
CPC .......... *G06F 17/30867* (2013.01); *G06Q 50/01* (2013.01)

(58) Field of Classification Search
CPC ..... H04L 12/586; H04L 12/588; H04L 67/14; H04L 67/306
USPC ......... 709/203, 204, 205, 206, 207, 217, 219, 709/223, 224, 225
See application file for complete search history.

(56) References Cited

U.S. PATENT DOCUMENTS

| | | | |
|---|---|---|---|
| 2008/0250332 A1 | 10/2008 | Farrell et al. | |
| 2008/0301237 A1* | 12/2008 | Parsons et al. | 709/206 |
| 2009/0077480 A1 | 3/2009 | Caunter et al. | |
| 2009/0300113 A1* | 12/2009 | Conmy et al. | 709/204 |
| 2010/0312713 A1* | 12/2010 | Keltner | G06F 3/048 |
| 2011/0225102 A1 | 9/2011 | Schleier-Smith | |
| 2012/0166532 A1 | 6/2012 | Juan et al. | |
| 2012/0203846 A1* | 8/2012 | Hull et al. | 709/206 |
| 2013/0282833 A1* | 10/2013 | Chattopadhyay et al. | 709/206 |

FOREIGN PATENT DOCUMENTS

| | | |
|---|---|---|
| KR | 10-2012-0035606 A | 4/2002 |
| KR | 10-2006-0020569 A | 3/2006 |

OTHER PUBLICATIONS

PCT International Search Report and Written Opinion, PCT Application No. PCT/US2013/051630, Oct. 22, 2013, eleven pages.

* cited by examiner

*Primary Examiner* — Barbara Burgess
(74) *Attorney, Agent, or Firm* — Fenwick & West LPP

(57) ABSTRACT

A user creates an event in a social networking system specifying a location, a time, and a guest list of other users invited to the event. The social networking system generates a page associated with the event that provides information about the event and identifies whether users have responded to invitations to the event. The content of the page may be customized for the user viewing the page to encourage the viewing user to attend the event. For example, the viewing user's relationship to and/or similar characteristics with other users on the guest list is determined and used by the social networking system to identify the users whose responses to invitations are shown to the viewing user via the page. Additionally, a notification method more prominently distributes acceptances of invitations to other users to encourage attendance.

24 Claims, 6 Drawing Sheets

CUSTOMIZED PRESENTATION OF EVENT GUEST LISTS IN A SOCIAL NETWORKING SYSTEM

BACKGROUND

This invention relates generally to social networking, and more specifically to communicating information about other users' responses to invitations to an event to a viewing user.

Social networks, or social utilities that track and enable online connections between users (including people, businesses, and other entities), have become increasingly prevalent. In particular, social networking systems allow users to associate themselves with other users to create a web of connections among the users of the social networking system. For example, users may establish connections with each other based on one or more common attributes in user profiles, such as, geographic location, employer, job type, age, musical preferences, interests, online games, or other attributes.

Some social networking systems also include tools that allow users to calendar events to coordinate activities with other users. In addition to providing event scheduling for the users involved, in the social networking system context, these calendaring tools also serve a socializing function of informing other users of the activities of their contacts. Often, a user creates an event by identifying a location, a time and a guest list of other users invited to the event, and a social networking system disseminates invitations to the event to other users. The social networking system receives responses from the other users to allow the creating user to determine who will be attending the event. Additionally, the social networking system may also generate and maintain a page associated with the event, allowing users to exchange information with each other via the page or to identify other users invited to the event or planning to attend the event in a convenient location.

However, many social networking systems use a page associated with an event to merely identify lists of users and their planned attendance to the event. While this provides a user with information about the event, the information provided does not account for a user's relationships with other users. For example, rather than identify other users connected to an invited user on the page associated with the event, conventional techniques merely provide a listing of users attending, possibly attending or invited to the event. While this provides some information about the event to the user, the information does not account for the user's relationships with other users, which may significantly influence the user's decision to attend the event.

SUMMARY

A social networking system allows its users to interact in a variety of ways to promote interaction between the users. For example, a social networking system allows a social networking system user to create an event where a group of social networking system users meet at a time and location. A user of a social networking system typically creates an event by specifying a location, a time, and a guest list of other social networking system users invited to the event. Additionally, the user creating the event may identify another social networking system user as an event host, which is a social networking system user with the ability to invite additional users to the event, to modify data associated with the event and/or to identify additional event hosts. When an event is created, the social networking system may also create a page associated with the event, allowing various users to post information associated with the event and/or to allow users to easily obtain information about the event by accessing the page associated with the event. In a web environment, the page may be a web page, whereas in other environments, such as native applications on mobile devices, the page may simply be a display screen on the user interface of the application. To encourage invited users to attend an event, the social networking system customizes presentation of a page associated with the event for a user viewing the page (i.e., the "viewing user"), where the viewing user may not have responded to an invitation or otherwise indicated an intention to attend the event.

In one embodiment, profile information for the viewing user and one or more other users invited to the event is used to determine the viewing user's relationship or similarities with other users invited to the event. The page associated with the event is then customized to display the pictures and/or identifying information for one or more of the users who have confirmed their attendance at the event or users who have indicated that they may attend the event. The social networking system may also use a notification system that distributes an accepting user's acceptance of an invitation to other users with a relationship to or similarity to the accepting user to further encourage event attendance.

For example, a viewing user may request a page associated with an event page in response to receiving an invitation to the event. Upon receiving the request for the page associated with the event, the social network system accesses a guest list associated with the event and determines the attendance state of each user on the guest list. The attendance state of a user indicates the user's intention to attend the event. For example, the social networking system allows a user to select from a group of possible attendance states, such as: attending, maybe attending, not attending, or not responded. Based on information from the viewing user's user profile and the user profiles of the users in each of the groups of users, users within each group are ranked based on relationship and/or similarity to the viewing user. Using the ranking, users from different groups are selected and presented to the viewing user. In one embodiment, from among the group of users who have accepted an invitation, users in the group having the highest number of mutual friends as the viewing user or that have a threshold number of matching or similar interests with the viewing user are presented to the viewing user via the event page. In another embodiment, the system trains a model using historical data and selects users based on a likelihood that showing the selected users will result in the viewing user attending the event.

To further encourage participation in an event, the social networking system may also prominently distribute acceptances to events to other users. In one embodiment, the social networking system determines a type associated with received responses to an event invitation. Example types of responses include an acceptance, a decline, or a qualified acceptance (e.g., a "maybe"). If a response has a type indicating an acceptance, a message identifying the acceptance and the user accepting the invitation is posted to the page associated with the event. A message describing the acceptance of the invitation may also be posted on a page associated with the accepting user. In some embodiments, a notification of the acceptance may be sent to other users connected to the accepting user encouraging users connected to the accepting user to also attend the event.

To minimize potential negative effects of responses declining an invitation on the decisions of others to attend an event, the social networking system may limit the other users notified of a response declining an invitation to an event. For example, if the system receives a response declining attendance to an event, the social networking system provides provide a prompt to the declining user to make a post, if desired. If the declining user provides a post, the post is posted on a decline page that is separate from the event page. A notification of the declination can be transmitted to the inviting user and the event host, but not to other users of the social network system. This limits distribution of negative responses to the event to prevent other users from being discouraged from attending the event.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the system. In use, users join the social networking system and then add connections to a number of other users to whom they desire to be connected. As used herein, the term "friend" refers to any other user to whom a user has formed a connection, association, or relationship via the system. Connections in social networking systems are usually in both directions, but need not be, so the terms "user" and "friend" depend on frame of reference. For example, if Bob and Joe are both users and connected to each other in the system, Bob and Joe are each other's friends. The connection between users may be a direct connection; however, some embodiments of a social networking system allow the connection to be indirect via one or more levels of connections. For example, two users may not be connected to each other, but may each be connected to a third user, who would be a "mutual friend" or a "mutual connection" of the two users. In many instances, online friends may also be friends in real life, for example, if the users are related by attendance at the same school or work for the same employer.

In addition to online interactions with other users, such as by monitoring and responding to posts on a friend's home page ("wall"), instant messaging, or interactive online game playing (e.g., Mafia Wars), the social networking system provides users with the ability to organize and facilitate interactions in real life by allowing the wide dissemination of events that may be of interest to a particular web of friends. Using the medium of a social networking system, a user may invite other users to real life events such as parties, baby showers, sporting events, networking events, and the like. Again, using the medium of social networks, the invitees can accept or decline.

Once responses to an event have been collected, the social network system can display a page associated with the event. Such an events page can show users who have responded to the event by category of attendance or "RSVP" status. By utilizing the connections established among the users who are invitees of event, the visual display of attendees of an event can be sorted so as to encourage attendance of the event by other users. Furthermore, a posting and notification system can be employed to also allow non-invitees who may be friends or mutual friends to join the event.

Figure 1:
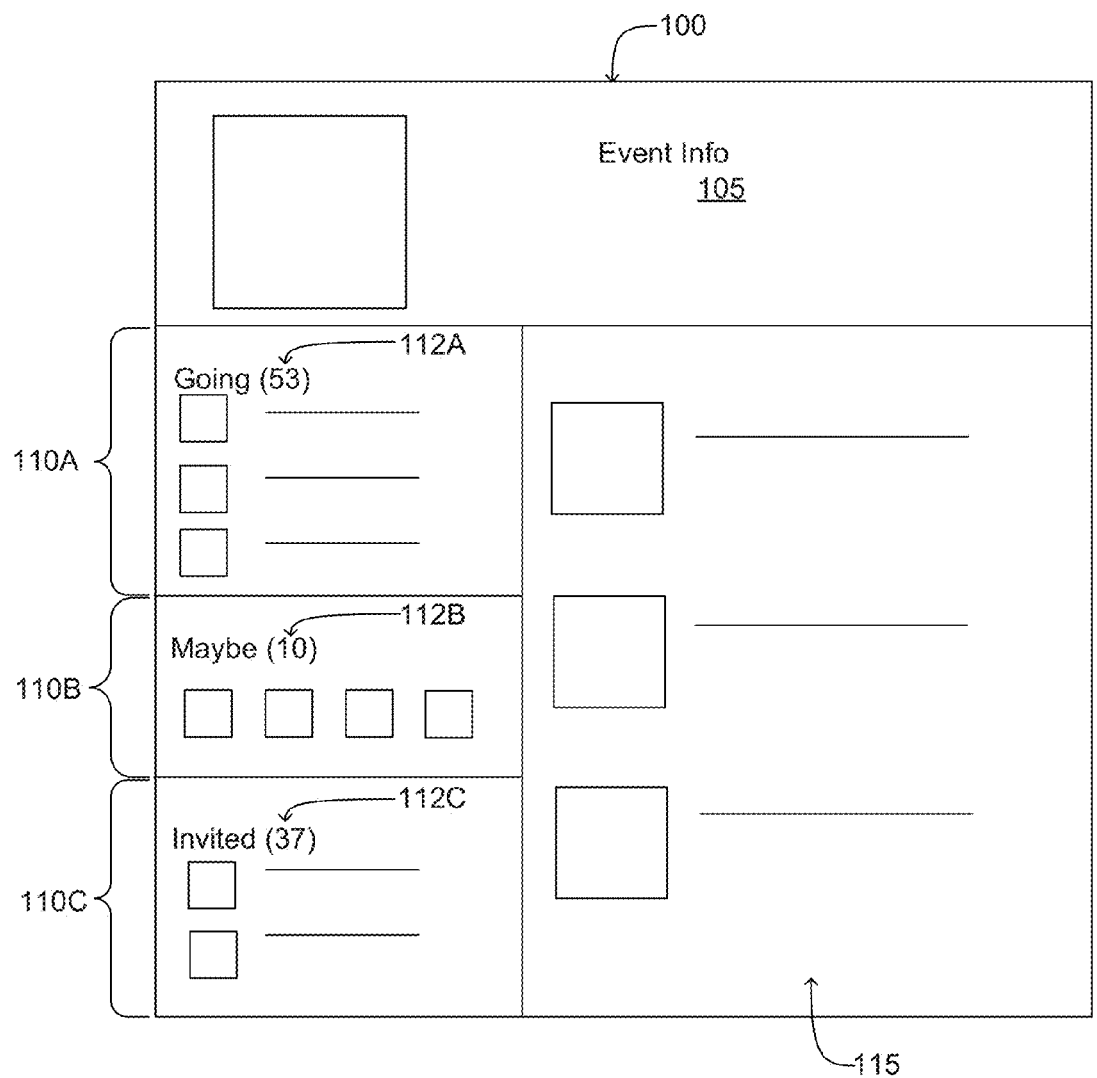
FIG. 1 is an example of a page associated with an event by a social networking system, in accordance with an embodiment of the invention.

FIG. 1 is an example of an event page 100 of a social network system. The event page is associated with an event created via the social networking system. In some embodiments, the event page 100 is presented to a user of the social networking system when the user accesses an invitation to an event or when the user accesses a link to the event, such as through a newsfeed story. An event page 100 typically provides event information 105, such as the name, location, time, and a description of the event, as well as an event wall 115. Comments or other content received from users is posted to the event wall 115 for viewing by additional users.

Social networking system users invited to an event receive an invitation to the event from the social networking system. When an invited user provides the social networking system with a response to the invitation, the social networking system associates an "acceptance state" with the invited user that is based on the response. In one embodiment, the social networking system maintains a specified number of acceptance states. For example, the social networking system maintains four potential acceptance states: an "accepted state," a "possible state," an "invited state" and a "declined state." The "accepted state" is associated with users who have provided a response indicating that they are attending an event. The "possible state" is associated with users who have provided a response indicating that they are uncertain if they can attend an event. The "invited state" is associated with users who have been sent an invitation to an event but have not provided a response. The "declined state" is associated with users who have provided a response indicating they are not attending the event.

The event page 100 may identify users based on acceptance states. In the example event page 100 of FIG. 1, information associated with users is displayed in different user groups 110A, 110B, 110C based on acceptance states. A user's image, name or other identifying information may be displayed in a user group 110A, 110B, 110C, allowing a user viewing the event page 100 to quickly identify different groups of users, such as users having different acceptance states.

For example, an attending user group 110A includes an attending user summary 112A identifying that the users displayed in the attending user group 110A are attending the event and identifies the total number of users in the attending user group 110A. Similarly, a possible user group 110B includes a possible user summary 112B to indicate a total number of users indicating they may attend the event, with a subset of those users identified in the possible user group 110B. An invited user summary 112C identifies a number of users that received an invitation to the event but that have not provided a response to the social networking system, with a subset of those users included in the invited user group 110C.

The accepted user group 110A, the possible user group 110B and the invited user group 110C display information identifying a subset of users in the respective groups. For example, a profile picture and user name are displayed for a subset of users in the accepted user group 110A and in the invited user group 110C, while a profile picture is displayed for a subset of users in the possible user group 110B. The subset of users displayed in the various groups 110A, 110B, 110C may be selected based on various factors. For example, a subset of users in a group 110A, 110B, 110C having the highest affinity for the user viewing the event page 100 are displayed. The displayed subset of users may be further ranked based on affinity, so that users in the subset having a higher affinity for the user viewing the event page 100 are more prominently displayed. In some embodiments, the subset of users displayed in a group 110A, 110B, 110C include users with a connection to the user viewing the event page 100, with other users in the group 110A, 110B, 110C presented in a separate display responsive to a user interaction with a group 110A, 110B, 110C. This allows the user viewing the event page 100 to quickly determine if other users to whom the viewing user is connected are attending the event. For example, invited users who are connected to the viewing user may be shown on the event page 100, while invited users that are not connected to the viewing user may not be identified on the event page. As another example, the subset of users displayed in a group 110A, 100B, 110C visually distinguishes users in the subset connected to the viewing user from users in the subset that are not connected to the viewing user, enabling the viewing user to more easily identify if other users connected to the viewing user are attending the event.

If a group 110A, 110B, 110C does not include users connected to the viewing user, the displayed subset of users may be personalized for the viewing user based on other information, such as attributes of the viewing user common to users in a group 110A, 110B, 110C. For example, if the viewing user is single, the subset of users displayed in a group 110A, 110B, 110C may include users that the viewing user would have an interest in dating, based on marital status, gender, gender preference and age of the viewing user and the users in the group 110A, 110, 110C. As another example, the subset of users displayed in a group 110A, 110B, 110C may include users having professional or other interests (e.g., hobbies) in common with the viewing user.

Users are presented in the groups 110A, 110B, and 110C in a manner to encourage the viewing user to attend the event. For example, users planning to attend the event or possibly attending the event are more prominently displayed than users that have not responded to the invitation to the event. In one embodiment, larger pictures or other identifiers are shown for users accepting an invitation to the event (users in the accept group) with a smaller number of users providing a response indicating that they are uncertain if they can attend the event displayed using smaller pictures or other identifiers. To further encourage attending the event, users connected to the viewing user may be visually distinguished from other users by the event page 100. For example, a profile picture and a user name for users connected to the viewing user may be displayed while a profile picture is displayed for users that are not connected to the viewing user.

The event wall 115 displays content received from users invited to the event and/or other users of the social networking system. In some embodiments, the ability to post on the event wall 115 depends on the acceptance state of a user. For example, in order to encourage participation by undecided viewing users, the ability to post comments on the event wall 115 may be limited to invited users having an accepted state or a possible state. Users having a declined state may be directed to a decline wall, separate from the event wall 100. This allows the event page 100 to display information from users attending, or possibly attending, the event to increase the likelihood that additional users attend the event.

System Architecture

Figure 2:
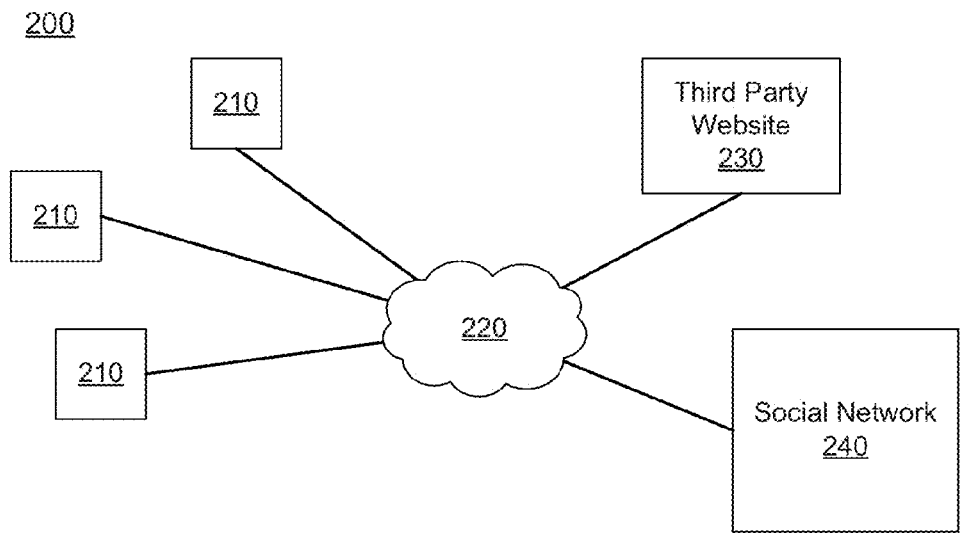
FIG. 2 is a network diagram of a system environment including a social networking system, in accordance with an embodiment of the invention.

FIG. 2 is a high level block diagram illustrating a system environment 200 for a social networking system 240. The system environment 200 comprises one or more client devices 210, a network 220, one or more third-party websites 230 and the social networking system 240. In alternative configurations, different and/or additional components may be included in the system environment 200. The embodiments described herein can be adapted to online systems that are not social networking systems.

The client devices 210 comprise one or more computing devices capable of receiving user input as well as transmitting and/or receiving data via the network 220. In one embodiment, a client device 210 is a conventional computer system, such as a desktop or laptop computer. In another embodiment, a client device 210 may be a device having computer functionality, such as a personal digital assistant (PDA), mobile telephone, smart-phone or similar device. A client device 210 is configured to communicate via the network 220. In one embodiment, a client device 210 executes an application allowing a user of the client device 210 to interact with the social networking system 240. For example, a client device 210 executes a browser application to enable interaction between the client device 210 and the social networking system 240 via the network 220. In another embodiment, a client device 210 interacts with the social networking system 240 through an application programming interface (API) that runs on the native operating system of the client device 210, such as iOS® or ANDROID™.

The client devices 210 are configured to communicate via the network 220, which may comprise any combination of local area and/or wide area networks, using both wired and wireless communication systems. In one embodiment, the network 220 uses standard communications technologies and/or protocols. Thus, the network 220 may include links using technologies such as Ethernet, 802.11, worldwide interoperability for microwave access (WiMAX), 3G, 4G, CDMA, digital subscriber line (DSL), etc. Similarly, the networking protocols used on the network 220 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 220 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec). The third party website 230 may be coupled to the network 220 for communicating with the social networking system 100, which is further described below in conjunction with FIG. 3.

Figure 3:
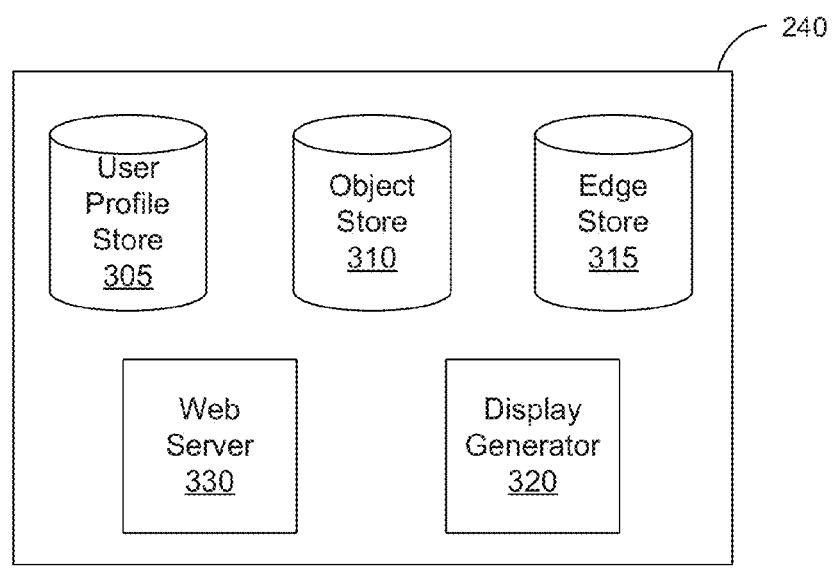
FIG. 3 is a block diagram of a system architecture of a social networking system, in accordance with an embodiment of the invention.

FIG. 3 is an example block diagram of a system architecture of the social networking system 240. The social networking system 240 includes a user profile store 305, an object store 310, an edge store 315, a display generator 320, and a web server 330. In other embodiments, the social networking system 240 may include additional, fewer, or different modules for various applications. Conventional components such as network interfaces, security functions, load balancers, failover servers, management and network operations consoles, and the like are not shown so as to not obscure the details of the system architecture.

Each user of the social networking system 240 is associated with a user profile, which is stored in the user profile store 305. A user profile includes declarative information about the user that was explicitly shared by the user, and may also include profile information inferred by the social networking system 240. In one embodiment, a user profile includes multiple data fields, each data field describing one or more attributes of the corresponding user of the social networking system 240. The user profile information stored in user profile store 305 describes the users of the social networking system 240, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 240 displayed in an image. A user profile in the user profile store 305 may also maintain references to actions by the corresponding user performed on objects in the object store 310 and stored in the object store 310.

The object store 310 stores information describing objects associated with the social networking system 240. Objects may include a variety of data, such as pages associated with a user or with an entity, actions performed by users, images, videos, audio files or other data maintained by the social networking system 240. In one embodiment, communications about user actions on and/or off the social networking system 240 are captured by the social networking system 240 and stored in the object store 310 to describe information about user actions. Such actions may include, for example, adding a connection to another user, sending a message to another user, uploading an image, reading a message from another user, viewing content associated with another user, attending an event posted by another user, among others. User activity both on the social networking system 240 and external to the social networking system 240, such as on external website 230, may be tracked and stored in the object store 310.

The object store 310 includes events associated with the social networking system 100. An event may be defined for a real-world event, such as a birthday party. A user interested in attending the event may establish a connection with an object associated with the event (the "event object"). A user may create the event object by defining information about the event such as a time, a location and a list of users invited to the event ("a guest list"). Invitations to the event are sent to the users included on the guest list, and those users may reply to the invitation with an acceptance state, as described above. Additionally, users may comment on the event, post their own content (e.g., pictures from the event), and perform any other actions enabled by the social networking system 240. Accordingly, the user creating the event as well as the users included on the guest list for the event may perform various actions that are associated with that event. The object store 310 includes data describing events, including one or more pages associated with an event, such as shown above in conjunction with FIG. 1.

In one embodiment, an edge store 315 stores the information describing connections between users and other objects on the social networking system 240 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 240, such as expressing interest in a page on the social networking system 240, sharing a link with other users of the social networking system 240, and commenting on posts made by other users of the social networking system 240. The edge store 315 stores edge objects that include information about the edge, such as affinity scores for objects, interests, and other users. Affinity scores may be computed by the social networking system 240 over time to approximate a user's affinity for an object, interest, and other users in the social networking system 240 based on the actions performed by the user. Systems and methods for computing user affinities for other users of a social networking system 200, as well as for other objects in the system, are disclosed in U.S. application Ser. No. 12/978,265, filed on Dec. 23, 2010, which is hereby incorporated by reference in its entirety. Multiple interactions between a user and a specific object may be stored in one edge object in the edge store 315, in one embodiment. In some embodiments, connections between users may be stored in the user profile store 305 or the user profile store 305 and/or object store 310 may access the edge store 315 to determine connections between users and/or objects.

The web server 330 links the social networking system 100 via the network 220 to the one or more client devices 210, as well as to the one or more third party websites 230. The web server 330 serves web pages, as well as other web-related content, such as JAVA®, FLASH®, XML and so forth. The web server 330 may provide the functionality of receiving and routing messages between the social networking system 100 and the client device 210, for example, instant messages, queued messages (e.g., email), text and SMS (short message service) messages, or messages sent using any other suitable messaging technique. A user may send a request to the web server 340 to upload information, for example, images or videos that are stored in the object store 310. Additionally, the web server 340 may provide API functionality to send data directly to native client device operating systems, such as IOS®, ANDROID™, WebOS® or RIM.

In one embodiment, a display generator 320 generates an event page personalized for a viewing user, as shown, for example, in FIG. 1. To generate an event page personalized for the viewing user, the display generator 320 accesses information associated with the user from the user store 305, such as the user's location based on information in the user store 305 (e.g., based on check-ins received from the user). Other data associated with the user is also accessed, including event information (e.g., an event object) from the object store 310. The display generator 320 also accesses information on connections between the viewing user and other users, as well as between the viewing user and other objects, such as event objects, is from the edge store 315. In one embodiment, information retrieved from the user profile store 305, object store 310, and edge store 315 are processed by the display generator 320 to generate groups of users based on the acceptance states of the user; the display generator 320 selects users for presentation using the event page based on the acceptance states. For example, the display generator 320 ranks users within groups of users based on acceptance states and identifies users presented by the event page as further described below in conjunction with FIG. 4.

In other embodiments, different system architectures may be used to generate the event and identify the acceptance states of users invited to the event. For example, a third party system, such as third-party website 230 receives data from a user to define an event and communicates with the social networking system 240 to obtain social data used to categorize users attending the event or to obtain the groups of users and their ranking. Alternatively, any system capable of capturing and storing information about interaction with other users or objects, such as events, may be considered a social networking system 240. Hence, any system using interactions between users, including responses to prior event invitations and/or attendance of prior events (rather than explicit connections between users) may group users invited to an event based on attendance state and organize users within a group based on user interaction as described herein. Hence, any suitable data describing interactions between users and each other and/or users and events may be used to implement the methods described herein.

Guest List Display

Figure 4:
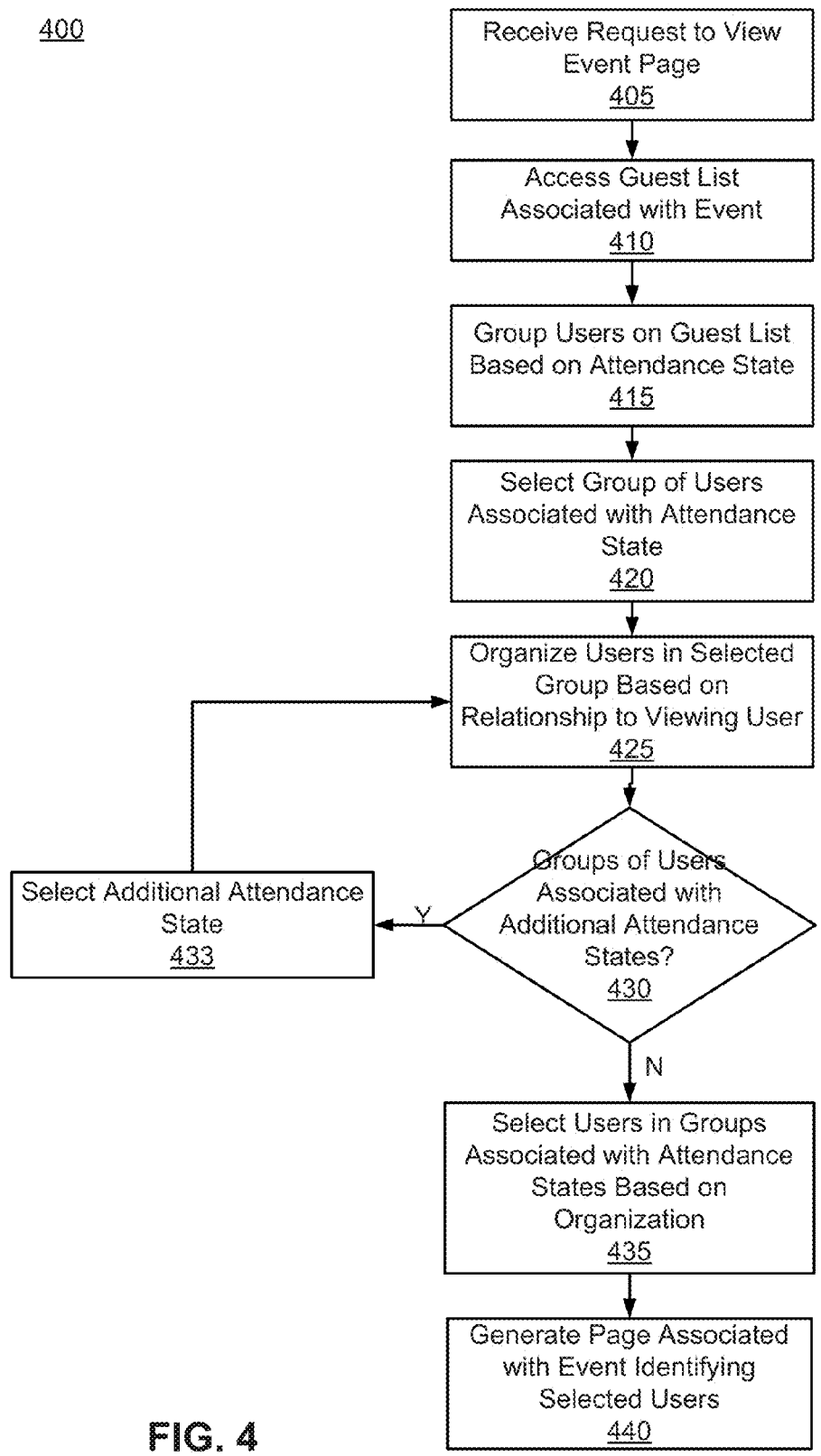
FIG. 4 is a flow chart of a method for personalizing a page associated with an event for a viewing user, in accordance with an embodiment of the invention.

To encourage viewers of an event to attend, a display generator 320 generates an event page customized to a user viewing the event page (a "viewing user"). FIG. 4 shows an example of a method 400 for generating an event page personalized to display selected users for a viewing user. Initially, the display generator 320 receives 405 a request from a viewing user to view the page associated with an event. The request may include an event identifier or other information allowing the display generator 320 to identify the corresponding event. The display generator accesses 410 a guest list associated with the identified event from the object store 310. Alternatively, the display generator 320 accesses 410 the guest list based on data stored in the object store 310 and the edge store 315. The guest list identifies users to whom an invitation to the event was sent. In one embodiment, the guest list also includes the acceptance state associated with users included on the guest list. Alternatively, user profiles associated with users included on the guest list include the acceptance state for the different users.

Based on the acceptance state associated with users included on the guest list, the display generator 320 groups 415 the users included on the guest list. In one embodiment, display generator 320 groups 415 the users on the guest list into groups based on their acceptance state, where users in a group have a common acceptance state. For example, the users included in the guest list are grouped 415 into a group of users having an accepted state ("attending users"), a group of users having a possible state ("possibly attending users"), a group of users having an invited state ("invited users") and a group of users having a declined state ("declined users").

The display generator 320 selects 420 a group of users associated with an attendance state and organizes 425 the users in the selected group based on their relationship to the viewing user. To determine relationships between the viewing user and users in the selected group, the display generator 320 may access user information contained in the user profile store 305 and rank the users in the selected group based on attributes of the viewing user and attributes of the users in the selected group. The display generator 320 may also access information about the user from the edge store 315 when ranking users in the selected group. For example, the display generator may rank users in the selected group based on the viewing user's location and the location of users in the selected group, prior events attended by the viewing user and users in the selected group, affinities between the viewing user and users in the selected group, shared interests between the viewing user and users in the selected group or other suitable attributes of the viewing user and/or users in the selected group In one embodiment, users in the selected group connected to the viewing user have a higher ranking than users in the selected group that are not connected to the viewing user.

Additional criteria may be used when organizing 425 the users within the selected group that are connected to the viewing user. For example, the user hosting the event and/or the user inviting the viewing user may be ranked higher than other users, so the user hosting the event and/or the inviting user may be ranked higher than other users. As another example, users within a group connected to the viewing user may be further ranked based on the number of users connected to both the viewing user and to the user in the group ("mutual connections"); for example, users with a higher number of mutual connections to the viewing user are ranked higher. Other data, such as affinity between the viewing user and users in the selected group, events commonly attended by the viewing user and users in the selected group, common locations of the viewing user and users in the selected group, common interests between the viewing user and users in the selected group or other suitable data may be used when organizing 425 users within a group. For example, friends can be grouped by diversity of friend clusters. As another example, if information associated with the viewing user indicates the viewing user is at its place of employment, users in a selected group are organized so that the users in a group that are connected to the viewing user and having the same place of employment or at the location of the place of employment are visually distinguished from other users in the group.

Users within the selected group that are not connected to the viewing user are also organized 425 based on one or more criteria. For example, users in the selected group may be ranked based on the number of mutual connections with the viewing user, so that users not connected to the viewing user having a higher number of mutual connections with the viewing user are ranked higher. Examples of other criteria for organizing 425 users in the selected group not connected to the viewing user include similar interests, background, and/or other user profile information between the viewing user and the users in the selected group. For example, if the viewing user is single, users in the selected group that are not connected to the viewing user may be ranked based on relationship status, gender and gender preference of the viewing user and/or of the users in the selected group. Hence, if the viewing user is single, the users in the selected group may be organized 425 so that single users in the selected group having the gender preferred by the viewing user have a higher ranking. To accomplish this, the display generator 320 may access relationship status and preferred gender information in the viewing user's user profile store 305 and compare that to user profile information 305 for users in the selected group. Hence, the display generator 320 uses information maintained by the social networking system 240 about the viewing user and additional users to customize users identified by a page associated with an event to make joining the event more attractive to the viewing user.

In some embodiments, the display generator 320 may organize 425 users in a selected group based on any suitable interactions between the users in the selected group and the viewing user. For example, rather than use connections between the viewing user and the users in the selected group, the display generator 320 may organize 425 users in the selected group based on any suitable interactions between the viewing user and the users in the selected group. Examples of interactions between the viewing user and users in the selected group include: an interest common to the viewing user and the user within the selected group, prior events attended by the user within the selected group, prior events attended by the viewing user and communication between the viewing user and the user within the selected group. This allows organization of users in a group even if connection information between the viewing user and the users in the group is unavailable or is limited.

After organizing 425 users in the selected group, the display generator 320 determines 430 if groups of users are associated with additional attendance states. In one embodiment, the display generator 320 identifies a subset of attendance states for which users are organized 425, so the display generator 320 determines 430 if groups of users are associated with additional attendance states in the subset. Alternatively, the display generator 320 determines 430 if a group of users is associated with any of the attendance states. Responsive to determining 430 a group of users is associated with an additional attendance state, the display generator 320 selects 435 the additional attendance state and organizes 425 the users in the group associated with the additional attendance state as described above.

Based on the organization of users within one or more groups, the display generator 320 selects 435 users from a group and generates 440 the page associated with the event that identifies the selected users. The display generator 320 may generate 440 a display including users invited to the event and organize how the users are presented based on the grouping and organization described above. In some embodiments, the generated page differently displays users connected to the viewing user and users not connected to the viewing user. For example, while users connected to the viewing user may be displayed according to their location in the organization with profile picture and identifying information shown, users not connected to the viewing user may have only their profile picture displayed with or without ranking (a display also referred to as a "facepile"). Additionally, presentation of users may depend upon the attendance state associated with the user. For example, a profile picture and a name are displayed for users in the group associated with the accepted state while a profile picture is displayed for users in the group associated with the possible state.

The display generator 320 may display the users in any suitable manner. Rather than display the selected users on a page associated with the event, the display generator 320 may identify the selected users as a story in another user's newsfeed or as recommendation units presented to another user. For example, the display generator 320 may select users that are identified to another user by any suitable communication channel based on the organization and ranking described above. Hence, the display generator 320 allows a user to be notified of other users confirming attendance to an event that are likely to encourage the user to attend the event as well.

In some embodiments, the display generator 320 places a limit on the number of users displayed within different groups associated with different acceptance states. The display generator 320 may generate 440 the page so that an increased number of smaller pictures are shown in a group to increase the number of users identified to the viewing user. In some embodiments, the order of users displayed within a group is randomized so that different users, or a different ordering of users, is shown different times the page is generated 440 for the viewing user. The display generator 320 may also include one or more advertisements based on the users attending the event, the users invited to the event, information about the viewing user, the event type, the event location or other suitable information for targeting advertisements.

Figure 6:
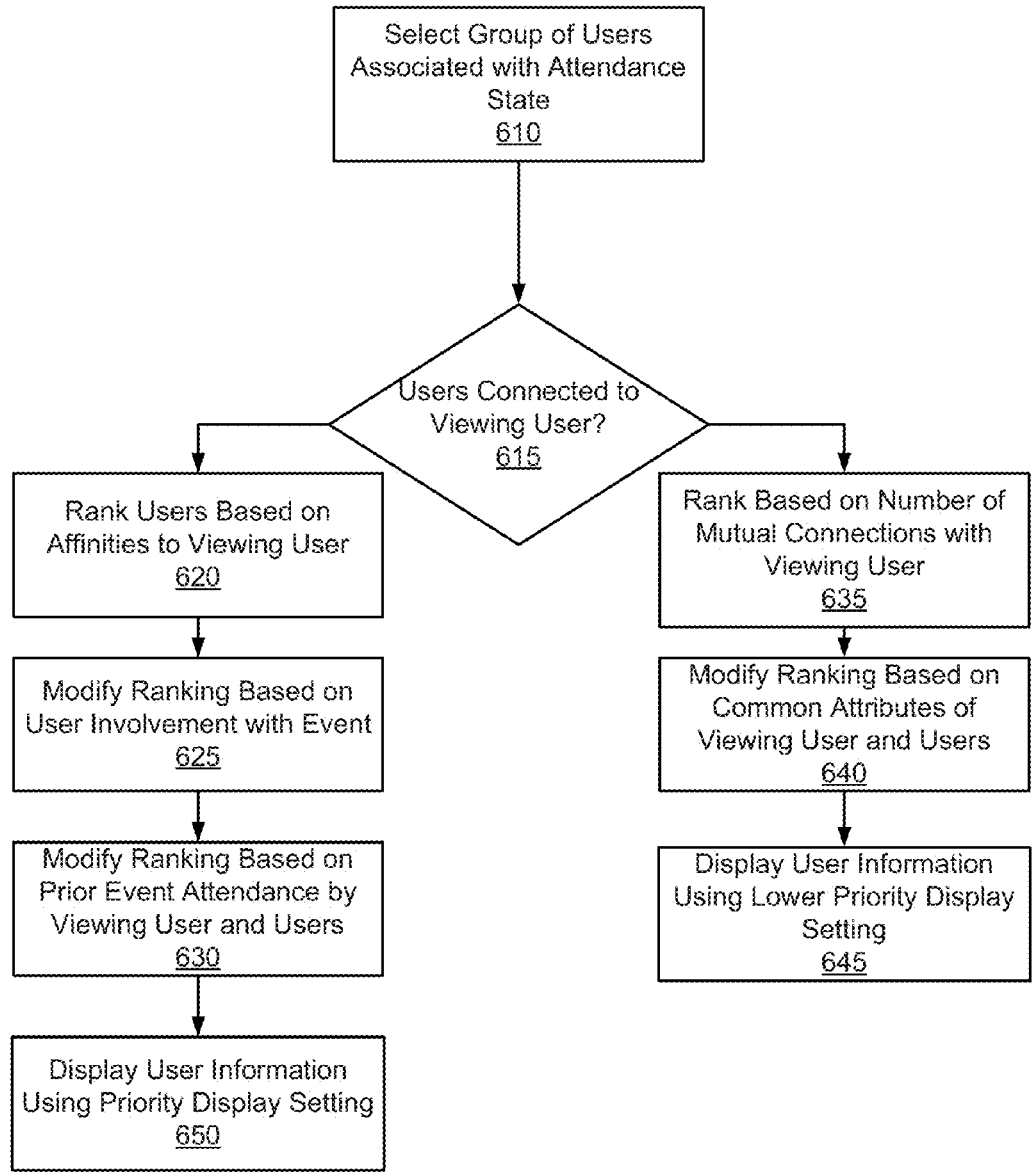
FIG. 6 is a flow chart of a method to select and rank users for display on an event page personalized for a viewing user, in accordance with an embodiment of the invention.

FIG. 6 shows one embodiment of a method for generating 440 a page for an event personalizing display of users invited to the event for a viewing user. The display generator 320 selects 610 a group of users associated with an acceptance state. For example, a group of users associated with one of four acceptance states described above—"accepted," "possible," "invited," or "declined" is selected 605. The display generator 320 determines 615 users in the selected group connected to the viewing user based on data in the user profile store 305 and/or in the edge store 315.

Users connected to the viewing user are ranked 620 based on their affinities for the viewing user. For example, users with higher affinities for the viewing user have a higher position in the ranking. Additional information about the users in the selected group may be used to modify the ranking. In one embodiment, the ranking is modified 625 based on the involvement of users in the selected group with the event, based on data from the user profile store 305 and from the object store 310. For example, the ranking of a user in the selected group that created or that is hosting the event is increased. As another example, the ranking of a user in the selected group that invited the viewing user to the event is increased. Additional attributes of the viewing user and attributes of the users in the selected group from the use profile store 305 may be used to further modify the ranking. For example, the ranking is modified 630 to increase the position in the ranking of users in the selected group that previously attended events with the viewing user. Other information may be used to modify 630 the ranking, such as the viewing user's location and the location of users in the selected group, shared interests between the viewing user and users in the selected group or other suitable attributes of the viewing user and/or users in the selected group.

Users not connected to the viewing user may be ranked 635 based on the number of users connected to the viewing user and connected to a user in the selected group. For example, users in the selected group connected to a larger number of other users that are connected to the viewing user have a higher ranking. The ranking may be modified 640 based on attributes of the viewing user and attributes of the users in the selected group. For example, the ranking is modified 640 to increase the position in the ranking of users in the selected group that previously attended events with the viewing user or to increase the position in the ranking of users in the selected group having a least a threshold number of interests in common with the viewing user. Other information may be used to modify 640 the ranking, such as the viewing user's location and the location of users in the selected group or other suitable attributes of the viewing user and/or users in the selected group. For example, if the viewing user is single, the ranking of users in the selected group that are not connected to the viewing user may be modified 640 based on relationship status, gender and gender preference of the viewing user and/or of the users in the selected group. Hence, if the viewing user is single, the ranking of the users in the selected group may be modified 640 so that single users in the selected group having the gender preferred by the viewing user have a higher ranking, as described above.

In one embodiment, the display generator 320 displays 650 users in the selected group that are connected to the viewing user using a priority display setting to make these users more visible. For example, a user name and a profile picture for users in the selected group connected to the viewing user and having at least a threshold position are displayed. Users in the selected group that are not connected to the viewing user may be displayed 645 using a lower priority display setting. For example, a profile picture only is displayed for users in a selected group that are not connected to the viewing user and have a threshold position in the ranking.

Posting and Notification

Figure 5:
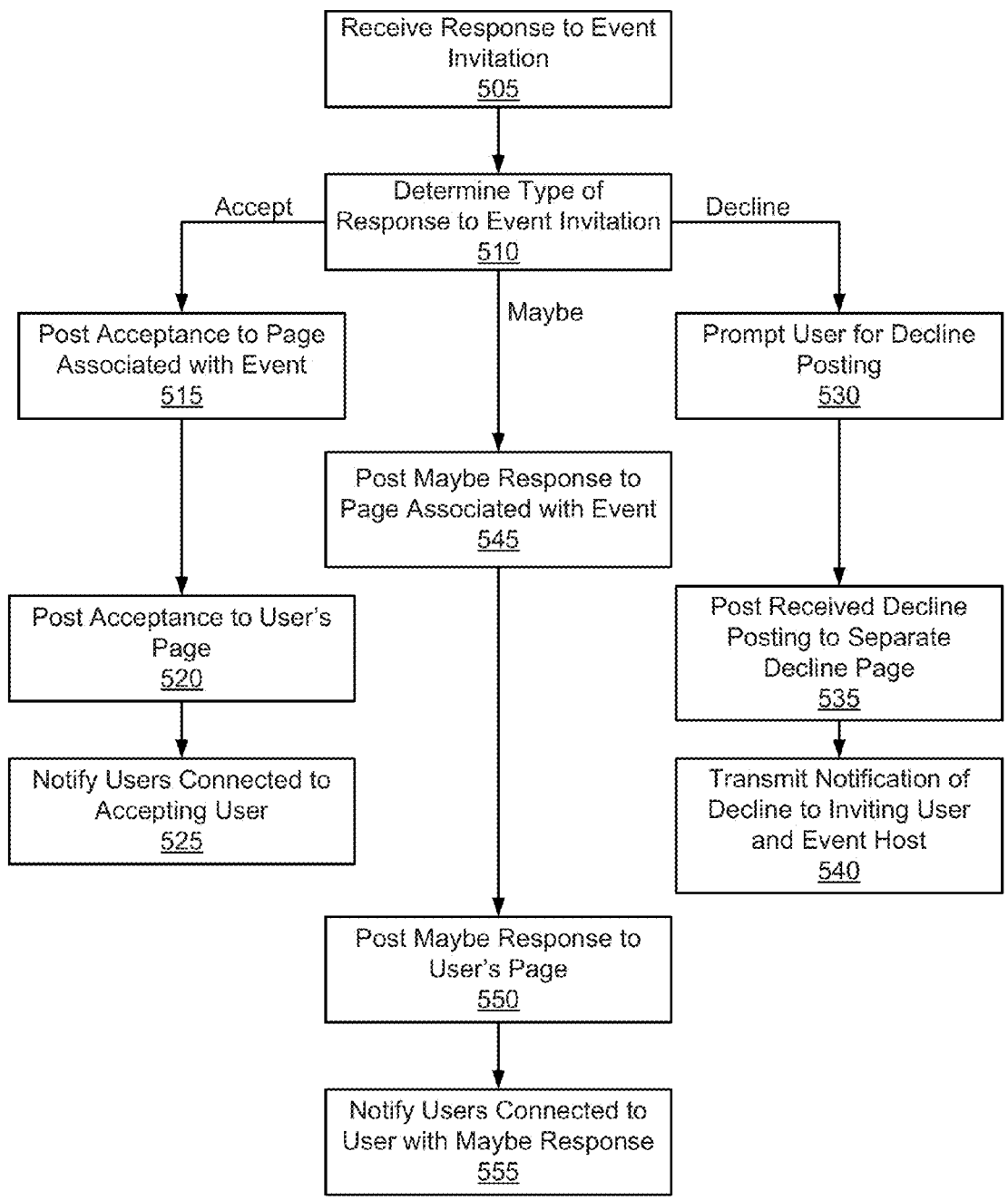
FIG. 5 is a flow chart of a method for notifying social networking system users of responses to an event invitation, in accordance with an embodiment of the invention.

To encourage undecided users to join an event, the social networking system 240 may identify users attending, or possibly attending, an event on the corresponding event page while omitting users declining an invitation to the event from being identified using the event page. FIG. 5 illustrates one embodiment of a method 500 for notifying social networking system users of responses to an event invitation, in accordance with an embodiment of the invention.

The social networking system 240 receives 505 a response to an event invitation from a user and determines 510 the type of the response. For purposes of illustration, FIG. 5 shows an embodiment where the response has one of three types: an accept, a maybe, or a decline. An accept response indicates the user is planning to attend the event, while a maybe response indicates that the user may attend the event. A decline response indicates that the user is not planning on attending the event.

If the response is an accept response, the display generator 320 posts 515 a message identifying the user and the acceptance to the event page. For example, a message indicating that the user is planning to attend the event is presented in an event wall on the event page. In one embodiment, a message indicating the user is planning to attend the event is also posted 520 on a page associated with the user. A notification of the acceptance may also be sent 525 to other users connected to the accepting user to encourage users connected to the accepting user to also attend the event.

If a maybe response is received, a message identifying the responding user and that the responding user may be attending the event is posted 545 to the event page. For example, a message indicating that the responding user may attend the event is presented in an event wall of the event page. The maybe response may also be posted 550 to a page associated with the responding user and/or a notification that the responding user may attend the event is sent 555 to other users connected to the responding user. In some embodiments, notifications of maybe or accept responses may be tailored to the affinity between the responding user and other users connected to the responding user. For example, notifications of maybe or accept responses are pushed to users with at least a threshold affinity for the responding user while notifications of maybe or accept responses are sent via conventional communication channels to users with less than the threshold affinity for the responding user.

By disseminating information about accept and maybe responses through a variety of communication channels, the social networking system 240 increases awareness of users attending, or possibly attending, an event. Additional examples of communication channels for distributing accept and maybe responses to event invitations include messages to users connected to the responding user via the social networking system or mobile devices, stories included in a newsfeed presented to users connected to the responding user, text messages, e-mails, presentation of information on websites external to the social networking system via a social plug-in or iframe or any other suitable communication channel. This publication of positive responses to event invitations may increase the likelihood of additional users accepting an invitation to the event. In some embodiments, the notifications sent to users connected to a user providing an acceptance or a maybe response includes a link, or other information, allowing the users receiving the notification to join the event. This increase the amount of users able to accept an invitation to the event (or "join" the event) by making additional use of connections between users.

Distribution of accept and maybe responses may be based on one or more additional factors to further encourage attendance of the event. For example, if a user is within a specified distance of an event's location, the user may receive, or more frequently receive, information identifying accept and maybe responses. As another example, the distribution of accept and maybe responses to a user may be modified based on the user's availability or current status; for example, if the user is available at the time of the event or is creating another event, information about maybe and accept responses is more frequently sent to the user. Information about accept and maybe responses may be sent to a user with increasing frequency or with different amounts of detail within a specified time from the time of the event.

However, if a decline response is received, the social networking system 240 prompts 530 the responding user for a posting identifying a reason for declining or providing other information. For example, the display generator 320 presents an input region to the responding user to provide a reason for declining. If a posting about declining the invitation is received, the posting is posted 535 on a decline page that is separate from the event page. For example, the display generator 320 creates the decline page, which identifies users declining invitations to the event as well as postings received from the declining users. Access to the decline page may be limited to certain users, such as the user hosting the event, the user creating the event and/or users that invited other users to the event. In one embodiment, the social networking system 140 also transmits 540 a notification identifying the decline response and the responding user to the event host and to the user that invited the responding user.

Hence, posts identifying users attending or possibly attending the event are displayed on the event page, allowing other users to quickly identify users that expressed an interest in the event. This encourages other users of a social networking system to also attend the event. To further encourage users joining an event, users invited to the event who decline an invitation are identified using a decline page that is separate from the event page. To prevent discouragement of other users from attending an event, posts made by users declining an invitation to the event are displayed on the decline page, making them less visible to other users. Similarly, by notifying a more limited set of users (e.g., the event host, the inviting user) about a user declining the invitation, negative responses to the event are not broadcast to a wide audience of users.

EXAMPLES

Figure 7:
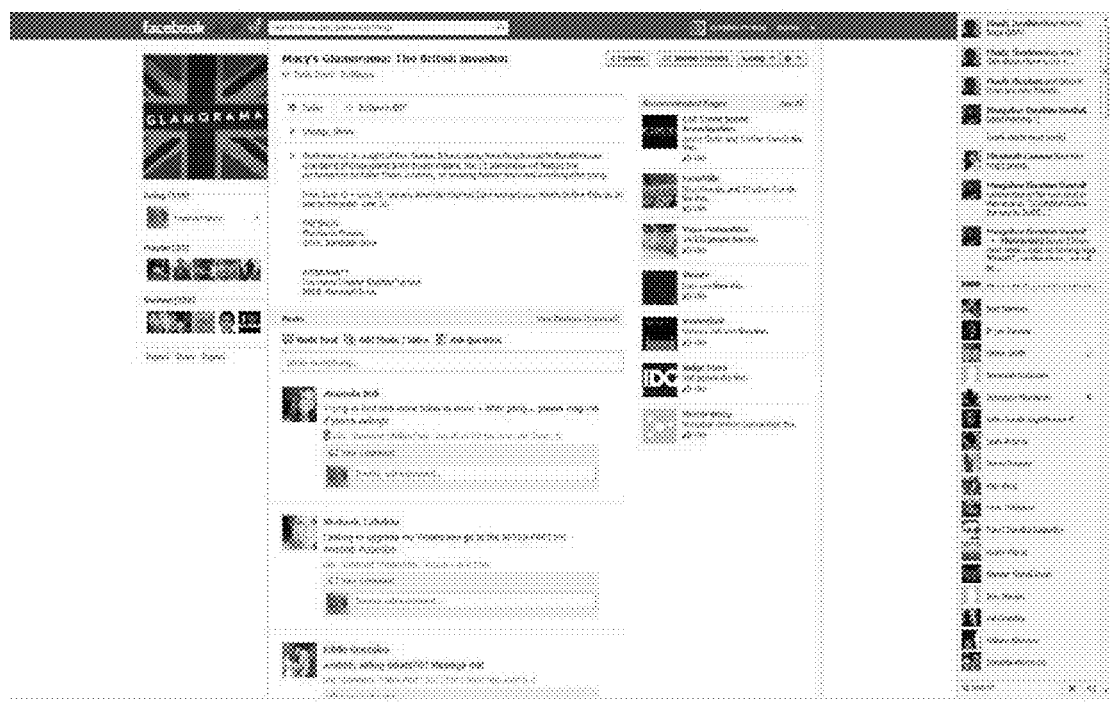
FIG. 7 is a screen shot of an event page personalized for a viewing user, in accordance with an embodiment of the invention.

FIG. 7 shows an example of an event page that can be generated using the methods of the present invention. As depicted, an event page typically provides event information, such as the name, location, and date of the event. In the example shown, a benefit fashion show is depicted. Immediately under the event information in the example are postings from users who have accepted the invitation to the event ("event wall").

To the left, users who are in the "going", "maybe", or "invited" acceptance groups are displayed, according to the methods discussed herein. A user's image, name or other identifying information may be displayed, allowing a viewing user to quickly identify different groups of users, such as those in different acceptance states. The number of users in an acceptance group is displayed. As discussed herein, the display of users can be customized for a particular viewing user, according to the methods disclosed herein.

The event page can also be customized for the display of advertisements that may be of interest to the viewing user, based on the viewing user's profile, those invited or attending the event, the event type, the event location, or other targeting information.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some embodiments of the invention may utilize algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
accessing a guest list associated with the event, the guest list identifying users of a social networking system who are invited to the event;
for each of the users identified by the guest list, determining, by a processor, an acceptance state for the user based on a response received from the user;
grouping, by the processor, the users identified by the guest list into one or more groups based on the acceptance state associated with each of the users, each of the one or more groups comprising users having a common acceptance state;
selecting a group from the one or more groups;
accessing a user profile associated with a viewing user;
accessing user profiles associated with the users in the selected group, the user profiles identifying characteristics of the users in the selected group;
ranking users within the selected group based on information from the user profile associated with the viewing user and the user profiles associated with the users in the selected group;
determining a display comprising a plurality of the users identified by the guest list based on the ranking; and
presenting the determined display to the viewing user.

2. The method of claim 1, wherein ranking users within the selected group based on information from the user profile associated with the viewing user and the user profiles associated with the users in the selected group further comprises:
identifying users within the selected group connected to the viewing user; and
ranking users within the selected group connected to the viewing user based on affinity with the viewing user.

3. The method of claim 2, wherein ranking users within the selected group based on information from the user profile associated with the viewing user and the user profiles associated with the users in the selected group further comprises:
determining whether a user within the selected group connected to the viewing user is a host associated with the event; and
responsive to determining a user within the selected group connected to the viewing user is the host associated with the event, increasing a ranking associated with the host associated with the event.

4. The method of claim 2, wherein ranking users within the selected group based on information from the user profile associated with the viewing user and the user profiles associated with the users in the selected group further comprises:
determining whether a user within the selected group connected to the viewing user is a user that invited the viewing user to the event; and
responsive to determining a user within the selected group connected to the viewing includes the user that invited the viewing user to the event, increasing a ranking associated with the user that invited the viewing user to the event.

5. The method of claim 2, wherein ranking users within the selected group based on information from the user profile associated with the viewing user and the user profiles associated with the users in the selected group comprises:
identifying users within the selected group that are not connected to the viewing user;
for each user in the selected group that is not connected to the viewing user, determining a user connected to both the viewing user and to a user in the selected group that is not connected to the viewing user; and
ranking the users within the selected group that are not connected to the viewing user based on an affinity between the viewing user and the user connected to both the viewing user and to the user in the selected group that is not connected to the viewing user.

6. The method of claim 5, wherein ranking users within the selected group based on information from the user profile associated with the viewing user and the user profiles associated with the users in the selected group comprising:
- identifying users within the selected group that are not connected to the viewing user;
- determining a number of mutual connections between the viewing user and each user within the selected group that are not connected to the viewing user; and
- ranking the users within the selected group that are not connected to the viewing user based on the number of mutual connections with the viewing user.

7. The method of claim 5, wherein ranking users within the selected group based on information from the user profile associated with the viewing user and the user profiles associated with the users in the selected group comprising:
- identifying users within the selected group that are not connected to the viewing user; and
- ranking the users within the selected group that are not connected to the viewing user based on the user profile associated with the viewing user and the user profiles associated with the users within the selected group that are not connected to the viewing user.

8. The method of claim 7, wherein ranking the users within the selected group that are not connected to the viewing user based on the user profile associated with the viewing user and the user profiles associated with the users within the selected group that are not connected to the viewing user comprises:
- determining a relationship status of the viewing user from the user profile associated with the viewing user;
- responsive to determining the relationship status of the viewing user is single, determining a preferred gender of the viewing user from the user profile associated with the viewing user; and
- identifying users within the selected group that are not connected to the viewing user having a relationship status of single and the preferred gender of the viewing user.

9. The method of claim 8, wherein determining the display based on the ranking comprises:
- selecting the identified users.

10. The method of claim 1, wherein presenting the determined display to the viewing user comprises:
- generating a page associated with the event, the page including the determined display.

11. The method of claim 10, wherein generating the page associated with the event for display to the viewing user comprises:
- responsive to the selected group of users including users connected to the viewing user, retrieving an image and a user name for each of the selected set of users; and
- responsive to the selected set of users not including users connected to the viewing user, retrieving the image for each of the selected set of users.

12. The method of claim 11, wherein the images for each of the selected set of users are placed in a different order each time the viewing user accesses the page associated with the event.

13. The method of claim 1, wherein the acceptance state is selected from a group consisting of: an accepted state indicating a received response indicating a user is attending the event, a possible state indicating a received response indicating the user is uncertain regarding attending the event, an invited state indicating the user has received an invitation but has not responded to the invitation and a declined state indicating the user is not attending the event.

14. The method of claim 1, wherein determining the display of at least a plurality of the users on the guest list based on the ranking comprises:
- generating a display including a list of the users on the guest list, the list ordered based on the ranking.

15. The method of claim 1, wherein determining the display of at least a plurality of the users on the guest list based on the ranking comprises:
- generating a display including a subset of users within the selected group and the common acceptance state associated with the selected group.

16. A method comprising:
- accessing a guest list associated with the event, the guest list identifying users of a social networking system invited to the event;
- for each of the users identified by the guest list, determining, by a processor, an acceptance state for the user based on a response received from the user;
- grouping, by the processor, the users identified by the guest list into one or more groups based on the acceptance state associated with each of the users, each of the one or more groups comprising users having a common acceptance state;
- selecting a group of users from the one or more groups;
- ranking the users within the selected group based on interactions between a viewing user and the users within the selected group;
- determining a display of at least a plurality of the users identified by the guest list based on the ranking; and
- presenting the determined display to the viewing user.

17. The method of claim 16, wherein the interactions between the viewing user and the users within the selected group comprise one or more selected from a group consisting of: a connection between the viewing user and a user within the selected group, an interest common to the viewing user and the user within the selected group, prior events attended by the user within the selected group, prior events attended by the viewing user and communication between the viewing user and the user within the selected group.

18. A computer program embodied on a non-transitory computer readable memory having instructions for performing steps comprising:
- accessing a guest list associated with an event, the guest list identifying users of a social networking system who are invited to the event;
- for each of the users identified by the guest list, determining, by a processor, an acceptance state for the user based on a response received from the user;
- grouping, by the processor, the users identified by the guest list into one or more groups based on the acceptance state associated with each of the users, each of the one or more groups comprising users having a common acceptance state;
- selecting a group of users from the one or more groups;
- accessing a user profile associated with a viewing user;
- accessing user profiles associated with the users in the selected group, the user profiles identifying characteristics of the users in the selected group;
- ranking users within the selected group based on information from the user profile associated with the viewing user and the user profiles associated with the users in the selected group;
- determining a display comprising a plurality of the users identified by the guest list based on the ranking; and
- presenting the determined display to the viewing user.

19. The computer program embodied on a non-transitory computer readable memory of claim 18, wherein ranking users within the selected group based on information from the user profile associated with the viewing user and the user profiles associated with the users in the selected group further comprises:
   identifying users within the selected group connected to the viewing user; and
   ranking users within the selected group connected to the viewing user based on affinity with the viewing user.

20. The computer program embodied on a non-transitory computer readable memory of claim 19, wherein ranking users within the selected group based on information from the user profile associated with the viewing user and the user profiles associated with the users in the selected group further comprises:
   determining whether a user within the selected group connected to the viewing user is a user that invited the viewing user to the event; and
   responsive to determining a user within the selected group connected to the viewing includes the user that invited the viewing user to the event, increasing a ranking associated with the user that invited the viewing user to the event.

21. The computer program embodied on a non-transitory computer readable memory of claim 18, wherein the acceptance state is selected from a group consisting of: an accepted state indicating a received response indicating a user is attending the event, a possible state indicating a received response indicating the user is uncertain regarding attending the event, an invited state indicating the user has received an invitation but has not responded to the invitation and a declined state indicating the user is not attending the event.

22. The computer program embodied on a non-transitory computer readable memory of claim 18, wherein determining the display of at least a plurality of the users on the guest list is based on the ranking comprises:
   generating a display including a list of the users on the guest list, the list ordered based on the ranking.

23. A computer program embodied on a non-transitory computer readable memory having instructions for performing steps comprising:
   accessing a guest list associated with an event, the guest list identifying users of a social networking system invited to the event;
   for each of the users identified by the guest list, determining, by a processor, an acceptance state for the user based on a response received from the user;
   grouping, by the processor, the users identified by the guest list into one or more groups based on the acceptance state associated with each of the users, each of the one or more groups comprising users having a common acceptance state;
   selecting a group of users from the one or more groups;
   ranking the users within the selected group based on interactions between a viewing user and the users within the selected group;
   determining a display comprising a plurality of the users identified by the guest list based on the ranking; and
   presenting the determined display to the viewing user.

24. The computer program embodied on a non-transitory computer readable memory of claim 23, wherein the interactions between the viewing user and the users within the selected group comprise one or more selected from a group consisting of: a connection between the viewing user and a user within the selected group, an interest common to the viewing user and the user within the selected group, prior events attended by the user within the selected group, prior events attended by the viewing user and communication between the viewing user and the user within the selected group.

* * * * *